US011323930B2

(12) United States Patent
Potentas

(10) Patent No.: US 11,323,930 B2
(45) Date of Patent: May 3, 2022

(54) METHOD OF AND RADIO ACCESS DEVICES FOR HANDOVER OF RADIO COMMUNICATIONS OF USER EQUIPMENT OPERATING THROUGH AN INTERMEDIATE MOBILE RADIO ACCESS DEVICE

(71) Applicant: Telefonaktiebolaget LM Ericsson (publ), Stockholm (SE)

(72) Inventor: Wojciech Potentas, Lódz (PL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/772,849

(22) PCT Filed: Dec. 27, 2017

(86) PCT No.: PCT/EP2017/084628
§ 371 (c)(1),
(2) Date: Jun. 15, 2020

(87) PCT Pub. No.: WO2019/129342
PCT Pub. Date: Jul. 4, 2019

(65) Prior Publication Data
US 2021/0084552 A1    Mar. 18, 2021

(51) Int. Cl.
*H04W 36/08*    (2009.01)
*H04W 36/00*    (2009.01)
(Continued)

(52) U.S. Cl.
CPC ....... *H04W 36/08* (2013.01); *H04W 36/0058* (2018.08); *H04W 36/0072* (2013.01); *H04W 84/005* (2013.01); *H04W 84/18* (2013.01)

(58) Field of Classification Search
CPC ... H04W 36/08; H04W 84/005; H04W 24/02; H04W 84/047; H04W 16/26; H04W 88/04; H04W 84/18; H04W 40/22
See application file for complete search history.

(56) References Cited

U.S. PATENT DOCUMENTS

2008/0171553 A1* 7/2008 Ren .................. H04W 72/02
455/450
2010/0260096 A1* 10/2010 Ulupinar ............ H04W 76/12
370/315
(Continued)

FOREIGN PATENT DOCUMENTS

EP         2713644 A1   4/2014
WO    2015139733 A1   9/2015

*Primary Examiner* — Nam T Huynh
(74) *Attorney, Agent, or Firm* — Sage Patent Group

(57) ABSTRACT

A method of handover of radio communication (70) between user equipment (71; 72; 73) and radio network access devices (31-37) of a radio access network (30) operatively connected by an intermediate mobile radio access device (50). Handover of the radio communication (70) is performed by the mobile radio access device (50) in association with mobile management entity functionality (40) available to the radio network access device (31) serving the radio communication (70) and a further radio network access device (32-37) of the radio access network (30) having received a handover request transmitted by the mobile radio access device (50).

11 Claims, 8 Drawing Sheets

(51) Int. Cl.
　　　*H04W 84/00*　　　(2009.01)
　　　*H04W 84/18*　　　(2009.01)

(56) References Cited

U.S. PATENT DOCUMENTS

| | | | |
|---|---|---|---|
| 2013/0229939 A1* | 9/2013 | Teyeb | H04W 36/30 370/252 |
| 2015/0049734 A1 | 2/2015 | Park et al. | |
| 2015/0065112 A1 | 3/2015 | Lee et al. | |
| 2015/0236778 A1 | 8/2015 | Jalali | |
| 2015/0282033 A1* | 10/2015 | Lunden | H04W 36/0079 455/436 |

* cited by examiner

METHOD OF AND RADIO ACCESS DEVICES FOR HANDOVER OF RADIO COMMUNICATIONS OF USER EQUIPMENT OPERATING THROUGH AN INTERMEDIATE MOBILE RADIO ACCESS DEVICE

TECHNICAL FIELD

The present disclosure generally relates to telecommunications, and in particular to a method of, and radio network access devices for handover of radio communications between user equipment and radio network access devices operating through a moving mobile radio access device. The present disclosure further relates to mobile vehicles comprising mobile radio access devices for providing coverage of a wireless communication network.

BACKGROUND

Self-propelled or locomotive vehicles, such as unmanned aircraft vessels, unmanned land vehicles, and unmanned marine vessels, are types of vehicles that may move autonomously, either on a pre-programmed path or steered from remote. These vehicles typically have their own locomotion engine such as, for example, a jet, propeller, wheel, crawler, propeller screw, hover propulsion, caterpillar or walking feet, either powered by a combustion engine, propulsion battery, thermal electric powering, nuclear powered or based on solar energy power, for example. These vehicles are also known under the generic term 'mobile robots', while the term 'robot locomotion' is the collective name for the various methods that robots use to transport themselves.

International patent application WO2015/139733 by applicant, discloses deployment of mobile robots for providing coverage of a wireless radio communication network, for example for use in those situations when the need for network capacity grows rapidly and it is urgent to create more and/or remote network coverage in an ad-hoc fashion.

WO2015/139733, in particular, sees to maintaining radio coverage when a deployed mobile robot, for example for refueling or recharging, is to be returned to a maintenance base, and replaced by a fresh mobile robot.

In an embodiment thereof, a plurality of mobile robots are deployed in a so-called daisy chain loop, having its start and end point at the maintenance base. Each mobile robot in the loop or chain takes a substantially stationary geographic position and comprises radio base station functionality for providing wireless access to end user equipment in a geographic radio coverage area of thus deployed mobile robot. For access to a core communication network, such as a land based communication network, the mobile robots may connect to the maintenance base or to a stationary land based radio access or base station, or a relay station, such as satellite relay station or a mobile robot operating as a wireless or radio relay station or radio communication hub, for example.

Each mobile robot in the loop or chain needs to be periodically replaced. A new or fresh robot may take the vacant position of a replaced robot or, alternatively, the mobile robots in the loop or chain may each be consecutively re-arranged to take up a vacant position closer to the end of the loop or chain, and the new mobile robot takes up a thus created vacant position at the start of the loop or chain.

When a mobile robot moves from a present geographic position to a new geographic position, and thereby covers a new geographic radio coverage area, while user equipment in a present geographic radio coverage area of the mobile robot do not concurrently move to the new geographic radio coverage area, i.e. camp in the present geographic radio coverage area, the radio communication links or attachments of the user equipment have to be handover to a new mobile robot taking up the present geographic position.

As disclosed in International patent application WO2015/139733, handover may be initiated by the maintenance base sending an instruction for handing over the handling of ongoing calls and/or packet data sessions, or the mobile robot may initiate handover based on the detection of an approaching mobile robot.

In an alternative, a user equipment initiated handover is invoked by decreasing the radio signal strength of the radio base station of the mobile robot leaving a particular geographic position while simultaneously increasing the radio signal strength of the base station of the new mobile robot taking up the particular geographic position.

The need for such handover is detected an triggered by the access network of the core communication network using well-known handover protocols and procedures for handover. Furthermore user equipment measurement reports may be used to indicate that handover is imminent.

In practice, it is advantageous to deploy mobile robots as long as possible at a particular geographic position, as this reduces signalling load between the mobile robots and the access network of the core communication network. Such signalling load can be substantial, in particular when all the mobile robots in a loop or chain are to be repositioned. Staying of the mobile robot in a particular geographic position also reduces signalling load between a mobile robot and user equipment that stays in the coverage area of the mobile robot. A reduced signalling load with the user equipment results in less battery power consumption for signal and control purposes, and hence a prolonged battery life or service time of the user equipment and the communication equipment of the mobile robot for data communication and calls. In particular in case of emergency operations, for example, when mobile robots may be deployed for providing coverage of a wireless communication network, power consumption of both the user equipment and mobile robot should be reduced as much as possible.

Handover of the radio communication links or attachments that the user equipment may have with a mobile robot, or more in general with a mobile radio access device, may also occur when the user equipment moves concurrently with the mobile radio access device, for example in the case of a user manned mobile vehicle.

U.S. Pat. No. 9,510,263 discloses an example of a mobile radio access device mounted in a train that routes at high speed through radio base stations positioned along the railway track, for example, while the user equipment, such as a mobile telephone, stays connected to the moving mobile radio access device or relay station as long as a user remains seated or at least stays within the radio coverage of a particular mobile radio access device. In such scenario, all the mobile radio access devices will perform handover procedures in short intervals of time.

Although mobile radio access devices in a train may receive power from the train engine, or via the electric overhead line system, in case of self-powered or self-propelled mobile radio access devices a reduced signalling load of the mobile radio access devices and the radio access network eventually results in less power consumption and use of less resources for signalling purposes, and hence a prolonged communication time.

Accordingly, there is a need for an efficient method of and equipment for providing handover of calls and data communication links and sessions between user equipment operatively connected to network access devices of a radio access network through a moving intermediate mobile radio access device, moving by a manned mobile vehicle or by an unmanned mobile vehicle, i.e. a mobile robot.

SUMMARY

The above mentioned and other objects are achieved, in a first aspect of the present disclosure, by a method of handover of radio communication between user equipment and radio network access devices of a radio access network, operatively connected by an intermediate mobile radio access device. The mobile radio access device comprises access node functionality interfacing the radio communication between the user equipment and the radio network access devices, and interoperable uplink access node functionality and uplink mobile communication functionality. The radio network access devices comprise access node functionality interfacing the radio communication between the user equipment and the radio network access devices, and interoperable downlink access node functionality and downlink mobile communication functionality.

In operation, uplink access node functionality of the mobile radio access device connects to downlink mobile communication functionality of a plurality of radio network access devices, and uplink mobile communication functionality of the mobile radio access device connects to downlink access node functionality of a plurality of radio network access devices, for exchanging messages for handover of the radio communication.

The method comprising:
receiving, by uplink mobile communication functionality of the mobile radio access device from downlink access node functionality of a radio network access device serving the radio communication, a request for handover of the radio communication;
transmitting, by uplink mobile communication functionality of the mobile radio access device, the request for handover for receipt by a further radio network access device of the plurality of radio network access devices, and
performing handover of the radio communication by the mobile radio access device in association with mobile management entity functionality available to the radio network access device serving the radio communication and a further radio network access device of the radio communication network having received the handover request transmitted by the uplink mobile communication functionality of the mobile radio access device.

In the method according to the present disclosure, handover of radio communication between user equipment and the radio access network, while the intermediate mobile radio device is moving with respect to a radio network access device serving the communication, is initiated by the radio network access device serving the radio communication in forwarding a request for handover of the radio communication from its downlink access node functionality.

A handover request received by the uplink mobile communication functionality of the mobile radio access device is transmitted by the uplink mobile communication functionality of the mobile radio access device for receipt by downlink access node functionality of a further radio network access device that is or becomes within the reach of the uplink mobile communication functionality of the moving mobile radio access device.

Accordingly, handover of the radio communication is performed under the control of the mobile management entity functionality of the radio network access devices, in accordance with prevailing and known handover protocols.

The above disclosed handover procedure avoids that the mobile radio access devices, on a regular basis, whether or not autonomously, have to make signal quality measurements of possible connections to radio network access devices when operating at a particular geographical position and/or while moving through the radio access network.

In this manner overall signalling load is reduced and only applied when required for performing a handover, with less power or energy consumption at the mobile radio access device compared to the preparation of periodic signal quality measurement reports by the mobile radio access device.

In the context of the present application and the claims, the term 'radio network access device' denotes a node of a wireless or radio access network that is used as interface between land-based communication links and radio based communication links, wherein the radio based communication link interfaces directly a user equipment. For example, in a GSM/2G access network a radio network access device refers to a BTS, in a WCDMA 3G access network a radio network access device refers to a NodeB, and in a LTE access network a radio network access device refers to a eNodeB. In a WLAN/Wi-Fi architecture a radio network access device refers to an Access Point (AP). Instead of the term radio network access device the term radio base station is also applied.

In the context of the present application and the claims, with respect to the mobile radio access device, the term 'uplink', UL, refers to signalling and communication from a mobile radio access device towards or in the direction of a radio network access device, and the term 'downlink', DL, refers to signalling and communication from a radio network access device towards or in the direction of a mobile radio access device. Further, the term 'access node functionality' refers to the signalling operations and functions that are implemented in and performed by a node of a wireless access network in operating a radio communication link in accordance with a particular radio or wireless network technology, such as but not limited to radio access network technologies known under the acronyms 2G, 3G, 4G, 5G, GSM, GPRS, GERAN, UTRAN, WCDMA, WLAN, Wi-Fi, etc. for accessing a mobile communication network such as a mobile backhaul network, or core network such as IMS, CS Core, PS Core, CDMA, LTE, GPRS core, etc. The term 'mobile communication functionality' refers to the signalling operations and functions that are implemented in and performed by a wireless or radio communication device or user equipment in operating a radio communication link in accordance with a particular radio or wireless network technology, such as any of the above-mentioned radio access network technologies.

Radio communication in the context of the present description and claims refers to any type of data communication or call or session by which content data are exchanged with user equipment. The user equipment may comprise mobile or non-mobile, i.e. stationary, devices such as mobile telephone and data communication equipment, Customer-Premises Equipment, CPE, or Internet of Things, IoT, devices, for example.

In an example of the method according to the first aspect of the present disclosure, prior to receipt of the request for handover, the uplink mobile communication functionality of the mobile radio access device receives from downlink access node functionality of the radio network access device serving the radio communication, a request for providing signal quality data of signals from radio network access devices received by the mobile radio access device, and transmits, in response to this request, the requested signal quality data by uplink mobile communication functionality of the mobile radio access device connected to downlink access node functionality of the radio network access device serving the radio communication.

The signal quality data are any of radio signal strength data indicative of the strength of a radio signal received at the mobile radio access device, such as Received Signal Strength Indicator, RSSI, data and/or bit error data at a particular radio link with a radio network access device, for example.

In this example, the serving radio network access device specifically requests the mobile radio communication device to prepare the signal quality measurements and to forward same to the radio network access device for use thereof in performing the handover. In this manner, both energy consumption at the mobile radio access device is reduced, compared to periodic autonomous preparation of measurement reports, while the serving radio network access device may use the signal quality results received for preparing a targeted handover.

In a further example of the method according to the first aspect of the present disclosure, prior to receiving the request for providing signal quality data by the mobile radio access device a triggering signal for transmitting the request for providing signal quality data is received by either the uplink mobile communication functionality or the uplink access node functionality of the mobile radio access device, and in response a triggering request for transmitting the request for providing signal quality data is transmitted by either the uplink mobile communication functionality of the mobile radio access device connected to downlink access node functionality of the radio network access device serving the radio communication or the uplink access node functionality of the mobile radio access device connected to downlink mobile communication functionality of the radio network access device serving the radio communication.

The triggering signal may be received by the mobile radio communication device from a mobile robot or a manned vehicle, for example, at which the mobile radio access device is mounted, when this vehicle moves across the radio access network. In the case of a mobile robot operating in a loop or daisy chain, for example, when commanded to occupy a different geographic location, such command may be simultaneously used as triggering request for having the radio access network device that serves an ongoing communication, to transmit a request for providing signal quality data to the mobile radio communication device, for initiating handover of a radio communication serviced by the moving mobile radio communication device.

In a yet further example of the method according to the first aspect of the present disclosure, the received handover request is a conditional handover request referring to a target radio network access device, wherein the handover request is transmitted by uplink mobile communication functionality of the mobile radio access device for receipt by a the target radio network access device.

Such a targeted handover request, among others, may be based on signal quality data received by the radio network access device serving the mobile radio access device prior to the handover. Targeted handover eventually requires less signalling load compared to a general handover request forwarded from a mobile radio access device, hence provides for further power consumption reduction at the mobile radio access device.

In a further example of the method according to the present disclosure, at a mobile radio access device, uplink access node functionality and uplink mobile communication functionality connect by backbone link functionality, and the request for handover received by uplink mobile communication functionality of the mobile radio access device is transferred over the backbone link functionality to the uplink access node functionality of the mobile radio access device, and transmitted by the uplink access node functionality for receipt by downlink mobile communication functionally of a further radio network access device of the plurality of radio network access devices.

In this example, the uplink mobile radio communication functionality of the radio access device remains available for further request messages, for example.

In another example of the present disclosure, the request for handover received by the uplink access node functionality of the mobile radio access device from a first or master uplink mobile communication functionality thereof, is transferred over the backbone functionality to a second or slave uplink mobile communication functionality of the mobile radio access device, for transmission thereof for receipt by a further radio network access device of the plurality of radio network access devices.

In this manner the request for handover is transmitted by uplink mobile communication functionality of the mobile radio access device in a master slave operation, wherein the master still remains available for further request messages, for example.

Further energy consumption savings at a mobile radio access device are achieved in another example of the first aspect of the present disclosure, wherein a supported radio communication is detached by the mobile radio access device after a set time interval after performing handover of the radio communication.

In a second aspect, the present disclosure provides a method of handover of a radio communication between user equipment and radio network access devices of a radio access network, operatively connected through an intermediate mobile radio access device. The mobile radio access device comprises access node functionality interfacing the radio communication between the user equipment and the radio network access devices, and interoperable uplink access node functionality and uplink mobile communication functionality. The radio network access devices comprise access node functionality interfacing the radio communication between the user equipment and the radio network access devices, and interoperable downlink access node functionality and downlink mobile communication functionality.

In operation, uplink access node functionality of the mobile radio access device connects to downlink mobile communication functionality of a plurality of radio network access devices, and wherein uplink mobile communication functionality of the mobile radio access device connects to downlink access node functionality of a plurality of radio network access devices, for exchanging messages for handover of the radio communication.

The method comprising:
transmitting, by downlink access node functionality of a radio network access device serving the radio communication to uplink mobile communication functionality of the mobile radio access device, a request for handover of the radio communication, and performing handover of the radio communication by the radio network access device serving the radio communication in association with the mobile radio access device and mobile management entity functionality available to the radio network access device serving the radio communication and a further radio network access device to which the radio communication is to be handover.

As described above, in the method according to the present disclosure, handover of radio communication between user equipment and the radio access network, while the intermediate mobile radio device is moving with respect to a radio network access device serving the communication, is initiated by the radio network access device serving the radio communication. Thereby avoiding that the mobile radio access devices have to make signal quality measurements of possible connections to radio network access devices when operating at a particular geographical position and/or while moving through the radio access network, reducing overall signalling load and power or energy consumption of the mobile radio access devices.

Handover of the radio communication is performed under the control of the mobile management entity functionality of the radio network access devices, in accordance with prevailing and known handover protocols.

The request for handover may be initiated by a radio network access device based on signal quality data of the radio signals of a moving mobile radio access device and/or the radio signals of the user equipment serviced by the moving mobile radio access device, received and measured by the radio network access device, such as any of radio signal strength data, such as Received Signal Strength Indicator, RSSI, data and/or bit error data at a particular radio link with a mobile radio access device, for example.

In an example of the method according to the second aspect of the present disclosure, prior to transmitting the request for handover of the radio communication by the radio network access device serving the radio communication the downlink access node functionality of the radio network access device serving the radio communication transmits to uplink mobile communication functionality of the mobile radio access device a request for providing signal quality data of signals from radio network access devices received by the mobile radio access device, and the requested signal quality data is received, in response to this request, by downlink access node functionality of the radio network access device serving the radio communication from uplink mobile communication functionality of the mobile radio access device.

The signal quality data are any of radio signal strength data indicative of the strength of a radio signal received at the mobile radio access device, such as Received Signal Strength Indicator, RSSI, data and/or bit error data at a particular radio link with a radio network access device, for example. By specifically requesting the mobile radio communication device, by the radio network access device, to prepare the signal quality measurements and to forward same to the radio network access device for use thereof in performing the handover, both energy consumption at the mobile radio access device is reduced, compared to periodic autonomous preparation of measurement reports, while the serving radio network access device may use the signal quality results received for preparing a targeted handover.

In a further example of the method according to the second aspect of the present disclosure, prior to transmitting the request for providing signal quality data by the mobile radio access device a triggering request for transmitting the request for providing signal quality data is received by downlink mobile communication functionality of the radio network access device serving the radio communication from uplink access node functionality of the mobile radio access device, wherein the downlink access node functionality and the downlink mobile communication functionality of the radio network access device connect by backbone link functionality at the radio network access device, and the triggering request is forwarded by the downlink mobile communication functionality over the backbone link functionality to the downlink access node functionality of the radio network access device.

In this example, the mobile radio access device itself initiates a trigger to the radio network access device to request for transmission of the request for providing signal quality data by the mobile radio access device.

In a yet further example of the method according to the second aspect of the present disclosure, the request for handover transmitted by the radio network access device serving the radio communication is a conditional handover request referring to a target radio network access device for handover of the radio communication, based on the signal quality data received at the radio network access device serving the radio communication.

Targeted handover provides for reduced signalling load of the mobile radio access device and, accordingly, reduced power consumption by the mobile radio access device.

In a further example of the method according to the second aspect of the present disclosure, handover is further based on load calculations of any of the access node functionality interfacing the user equipment and the radio network access device serving the radio communication, and the downlink access node functionality and downlink mobile communication functionality of the radio network access device serving the radio communication for exchanging messages for handover of the radio communication.

These load calculations facilitate targeted handover to another radio network access device having sufficient communication and/or signalling capacity for handling the radio communication and/or the exchange of messages with mobile radio access devices, as disclosed above.

In a third aspect, the present disclosure provides a method of handover of radio communication between user equipment and radio network access devices of a radio access network, operatively connected by an intermediate mobile radio access device, wherein the mobile radio access device operatively connects to processor control circuitry of a mobile robot.

The mobile radio access device comprises access node functionality interfacing the radio communication between the user equipment and the radio network access devices, and interoperable uplink access node functionality and uplink mobile communication functionality. The radio network access devices comprise access node functionality interfacing the radio communication between the user equipment and the radio network access devices, and interoperable downlink access node functionality and downlink mobile communication functionality.

In operation, uplink access node functionality of the mobile radio access device connects to downlink mobile communication functionality of a plurality of radio network access devices, and uplink mobile communication functionality of the mobile radio access device connects to downlink access node functionality of a plurality of radio network access devices, for exchanging messages for handover of the radio communication.

The method comprising transmitting, by the processor control circuitry, to one of the uplink access node functionality of the mobile radio access device connected to downlink mobile communication functionality of the radio network access device serving the radio communication and uplink mobile communication functionality of the mobile radio access device connected to downlink radio access functionality of the radio network access device serving the radio communication, a triggering signal for transmitting, by the downlink radio access functionality of the radio network access device serving said radio communication, a request or providing signal quality data.

The signal quality data are any of radio signal strength data indicative of the strength of a radio signal received at the mobile radio access device, such as Received Signal Strength Indicator, RSSI, data and/or bit error data at a particular radio link with a radio network access device, for example.

In an example, wherein a sequence of 1-N mobile robots is deployed in a chain or loop taking up 1-N different geographic positions, such that one mobile robot occupies one geographic position, and each geographic position having number n+1 is closer to a landing base than a geographic position having number n, wherein n and N are integer values and $1 \leq n \leq N$, the triggering signal is transmitted if a mobile robot starts to change its geographical position from n to n+1.

In a fourth aspect, the present disclosure relates to a mobile radio access device comprising first wireless transceiver circuitry operatively connected to processor control circuitry and arranged for providing access node functionality for interfacing a radio communication between user equipment and radio network access devices operating in a radio access network.

The mobile radio access device further comprises second wireless transceiver circuitry, operatively connected to the processor control circuitry and arranged for providing interoperable uplink access node functionality and uplink mobile communication functionality, wherein the uplink access node functionality of the mobile radio access device is arranged for connecting to downlink mobile communication functionality of a plurality of radio network access devices of the radio access network, and wherein the uplink mobile communication functionality of the mobile radio access device is arranged for connecting to downlink access node functionality of a plurality of radio network access devices of the radio access network, for exchanging messages for handover of a radio communication.

The processor control circuitry of the mobile radio access device is further arranged for handover of a radio communication in accordance with the method of the first aspect of the present disclosure.

In a fifth aspect, the present disclosure relates to a radio network access device for operating in a radio access network, the radio network access device comprising first wireless transceiver circuitry operatively connected to processor control circuitry and arranged for providing access node functionality for interfacing a radio communication between user equipment and a radio communication network.

The radio network access device further comprises second wireless transceiver circuitry, operatively connected to the processor control circuitry and arranged for providing interoperable downlink access node functionality and downlink mobile communication functionality, wherein the downlink access node functionality of the radio network access device is arranged for connecting to uplink mobile communication functionality of a plurality of mobile radio access devices operating in the radio access network.

The downlink mobile communication functionality of the radio network access device is arranged for connecting to uplink access node functionality of a plurality of mobile radio access devices operating in the radio access network, for exchanging messages for handover of a radio communication, wherein the processor control circuitry of the radio network access device is further arranged for handover of a radio communication in accordance with the method of the second aspect of the present disclosure.

The various functionality of any of a mobile radio access device and a radio network access device disclosed above may either be one of dedicated hardware and/or software modules, where applicable.

In a sixth aspect the present disclosure relates to a mobile robot, comprising processor control circuitry and at least one mobile radio access device according to the third aspect of the present disclosure, wherein the processor control circuitry of the mobile robot operatively connects to either one of uplink access node functionality or uplink mobile communication functionality of at least one mobile radio access device, and is arranged for operating the method according to the fifth aspect of the present disclosure.

In a seventh aspect of the present disclosure, there is provided computer readable storage media, inclusive transitory and non-transitory storage media, comprising computer program code instructions which, when loaded on processor control circuitry of a respective one of a mobile radio access device, a radio network access device, and a mobile robot, are arranged for performing the method according to a respective one of the first, second and fifth aspect of the present disclosure.

The above-mentioned discussed and other aspects of the disclosure will be apparent from and elucidated with reference to the examples described hereinafter.

DETAILED DESCRIPTION

Figure 1:
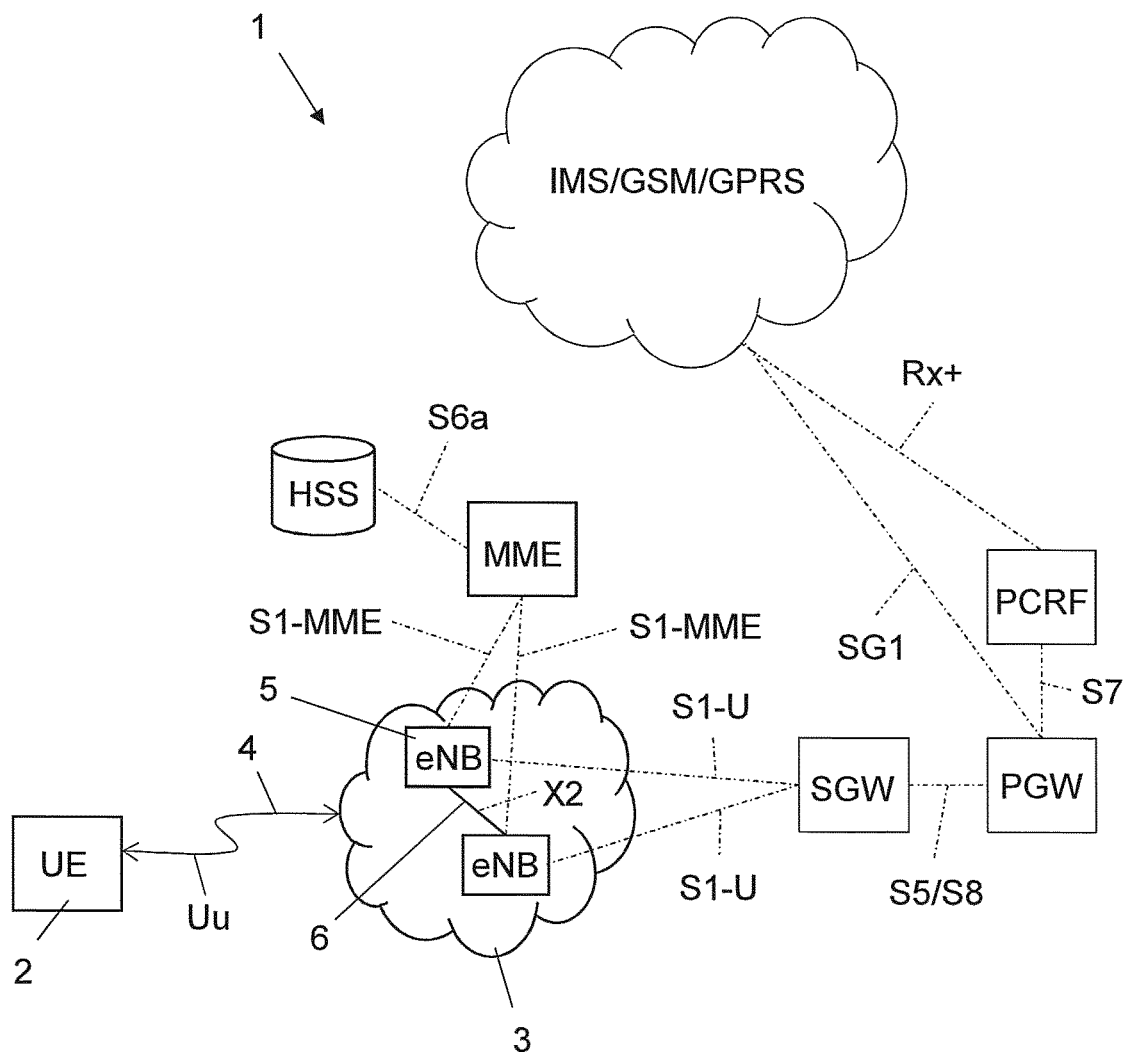
FIG. 1 illustrates, schematically, a prior art communication reference architecture of a telecommunication system.

In FIG. 1, reference numeral 1 indicates a reference architecture of a telecommunication system for data communication and telephone calls, for the purpose of illustrating various network interfaces in the context of the present disclosure. For reasons of simplicity, the architecture 1 shown refers to a non-roaming situation, however the present disclosure relates to both roaming and non-roaming communication systems.

Reference numeral 3 indicates a wireless or Radio Access Network, RAN, providing wireless or radio access to the telecommunication system for a plurality of end user equipment, UE, as a whole denoted by reference numeral 2. The UE 2 may comprise mobile or non-mobile devices, such as mobile telephone and data communication equipment, Customer-Premises Equipment, CPE, or Internet of Things, IoT, devices, for example. Part of the system architecture 1 beyond the RAN 3 and the UE 2 may comprise several communication networks, each operating in accordance with a specific communication technology.

For the purpose of the present disclosure the RAN 3 may operate in accordance with any wireless or radio access technology such as but not limited to radio access network technologies known under the acronyms 2G, i.e. second generation; 3G, i.e. third generation; 4G, i.e. fourth generation; 5G, i.e. fifth generation; GERAN, i.e. GSM/EDGE RAN, Global System for Mobile Communications/Enhanced Data rates for GSM Evolution; GPRS, i.e. General Packet Radio Services; UTRAN, i.e. Universal Terrestrial RAN; WCDMA, Wideband Code Division Multiple Access; WLAN, Wireless Local Area Network; Wi-Fi, etc.

The servers or nodes explicitly shown in FIG. 1, refer to a general communication architecture, wherein SGW denotes a Serving Gateway, PGW a Packet Data Network Gateway, PCRF a Policy and Charging Rules Function, MME a Mobility Management Entity, and HSS a Home Subscriber Server. The operation of these network nodes for exchanging communication with various data communication systems or technologies such as, but not limited to, IMS, Internet Protocol Multimedia Subsystem; Circuit Switched, CS, Core; Packet Switched, PS, Core; Code Division Multiple Access, CDMA, Long Term Evolution, LTE, GPRS core, etc. is specified in various standards and is well-known to the person skilled in the art.

The RAN 3 shown in FIG. 1 is exemplary for an E-UTRAN, Evolved-UTRAN, and LTE radio access network, having radio network access devices or radio base stations or radio access nodes, called eNode B or eNB, referred to by reference numeral 5.

The dashed-dotted lines in FIG. 1 indicate the communication and signalling interfaces between the several network nodes and the RAN 3 and UE 2. For example, the radio communication interface between the UE 2 and the RAN 3 is generally called the Uu interface, the communication interface between the eNB 5 and the SGW is called the S1 or S1-U interface, and the communication interface between the eNB 5 is called the X2 interface.

Figure 2:
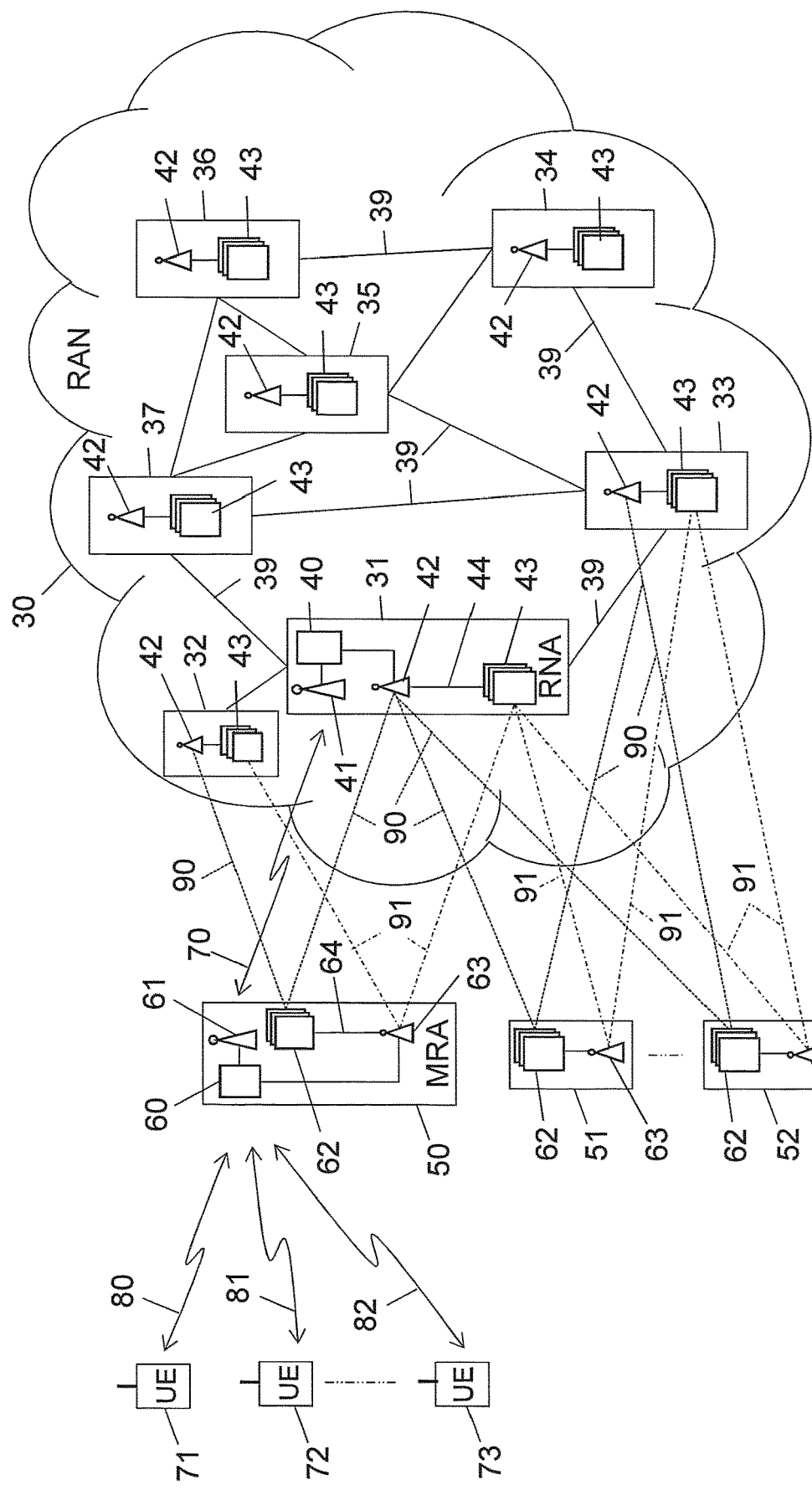
FIG. 2 illustrates, schematically, a radio access network, RAN, and mobile radio access devices arranged for operating in accordance with the present disclosure.

FIG. 2 illustrates a radio access network, RAN, 30 arranged for operating in accordance with the present disclosure using a radio access technology, such as a radio access technology disclosed above with reference to FIG. 1. The RAN 30 comprises a plurality of interconnected 39 Radio Network Access, RNA, devices 31-37, of which radio network access device 31 is shown in more detail. For clarity reasons, the connection of the radio network access devices 31-37 to a core communication network is not illustrated in FIG. 2.

It will be appreciated that the RAN 30 may be comprised of radio access networks operated by different providers in a same country or different countries. For the purpose of the present disclosure, handover includes both handover to a radio network access device in a same or different RAN.

Reference numerals 50-52 denote Mobile Radio Access, MRA, devices each, for example, mounted at manned and/or unmanned mobile vehicles or mobile robots. In the case of individual moving mobile robots deployed for providing coverage for a wireless communication network, for example for use in those situations when the need for network capacity grows rapidly and it is urgent to create more and/or remote network coverage in an ad-hoc fashion, the mobile radio access devices 50-52 may operate in a so-called daisy chain or loop configuration with respect to a maintenance base. Wherein the mobile vehicles or mobile robots are deployed such that their individual or local radio coverage areas, as a whole, provide the required coverage for the wireless communication network.

The radio network access devices 50-52, in another example, may also move concurrently when mounted in wagons of a train or at different compartments of a ship or other vehicle, for example, which train or ship or other vehicle routes through the RAN 30.

In operation, each of the radio network access devices 50-52 serves a radio communication, such as a data communication session and/or telephone call, with mobile and/or stationary User Equipment, UE, 71-73, such as mobile telephone and data communication equipment, Customer-Premises Equipment, CPE, or Internet of Things, IoT, devices, for example. In FIG. 2, for simplicity, only the mobile radio access device 50 is shown to serve a radio communication 80, 81, 82 with a respective UE 71, 72, 73. It goes without saying that the other mobile radio access devices 51, 52 may also serve a plurality of UE (not shown).

For interfacing a radio communication 80, 81, 82 with a UE over a respective Uu interface thereof, and for interfacing a radio communication 70 with a radio network access device over a respective Uu interface, each of the radio network access devices 50-52 comprises processor control circuitry 60 controlling access node functionality 61 of a respective mobile radio access device 50-52. The term 'access node functionality' is to be construed as comprising the required hardware and software modules for operating radio communication in accordance with the Uu protocol of a particular radio access technology.

Each of the radio network access devices 31-37 comprises processor control circuitry 40 controlling access node functionality 41 of a respective radio network access device 31-37. The term 'access node functionality' is to be construed as comprising the required hardware and software modules for operating radio communication in accordance with the Uu interface protocol of a particular radio access technology.

The mobile radio access devices 50-52, in accordance with the present disclosure, further comprise interoperable uplink access node functionality 63 and uplink mobile communication functionality 62, and the radio network access devices 31-37 comprise interoperable downlink access node functionality 42 and downlink mobile communication functionality 43. Interoperability of the uplink access node functionality 63 and the uplink mobile communication functionality 62 is provided by backbone functionality 64 at the mobile radio access device 50-52. Interoperability of the downlink access node functionality 42 and the downlink mobile communication functionality 43 is provided by backbone link functionality 44 at the radio network access device 31-37.

With reference to what is defined above in connection with the term access node functionality, the term 'mobile communication functionality' is to be construed as comprising the required hardware and software modules for operating radio communication in accordance with the Uu interface protocol of a particular radio access technology. The term 'backbone functionality' is to be construed as comprising the required hardware and software modules for communication between downlink access node functionality 42 and downlink mobile communication functionality 43 in accordance with a respective protocol of a particular radio access technology.

The term 'uplink' refers to signalling and communication from a mobile radio access device towards or in the direction of a radio network access device, and the term 'downlink' refers to signalling and communication from a radio network access device towards or in the direction of a mobile radio access device.

In operation, the uplink access node functionality 63 of a mobile radio access device 50-52 connects to or is connectable to downlink mobile communication functionality 43 of a plurality of radio network access devices 31-37, and uplink mobile communication functionality 62 of a mobile radio access device 50-52 connects to or is connectable to downlink access node functionality 42 of a plurality of radio network access devices 31-37, for exchanging messages for handover of the radio communication 70.

Figure 3:
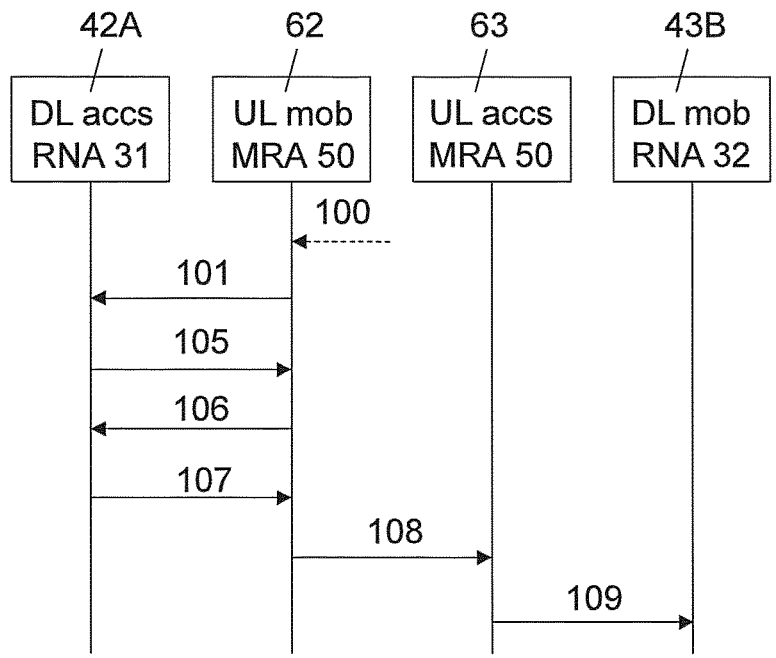
FIGS. 3, 4, 5 and 9 show a message sequence charts illustrating various steps of the method according to the present disclosure for handing over a radio communication.

FIG. 3 shows a message sequence chart of the method according to the present disclosure for handing over radio communication, such as radio communication 70, between a moving mobile radio access device, such as mobile radio access device 50, and a radio access network device serving the radio communication to be handed over, such as radio network access device 31. Let assume that the radio communication 70 is handed over from radio network access device 31 to radio network access device 32. In the message chart, time runs from the top to the bottom of the drawing sheet.

Reference numeral 42A refers to downlink access node functionality 42 of the radio network access device 31, DL access RNA 31, serving the communication to be handed over. Reference numeral 62 refers to uplink mobile communication functionality of the mobile radio access device 50, UL mob MRA 50. Reference numeral 63 refers to uplink access node functionality of the mobile radio access device 50, UL access MRA 50, and reference numeral 43B refers to downlink mobile communication functionality of another radio network access device 32, DL mob RNA 32, for continuing the radio communication 70 to be handed over.

The request for handover 107 is transmitted, over the Uu interface 90, by downlink access node functionality 42A of the radio network access device 31 presently serving the radio communication 70, to uplink mobile communication functionality 62 of the mobile radio access device 50. After receipt thereof, the request for handover is transmitted by the uplink mobile communication functionality 62 of the mobile radio access device 50 for receipt by a further radio network access device 32-37 of the RAN 30.

In the present example, the request for handover is first transferred 108, by the uplink mobile communication functionality 62, over the backbone functionality 64, to the uplink access node functionality 63 of the mobile radio access device 50, and subsequently transmitted 109, over the Uu interface 91, by the uplink access node functionality 63 of the mobile radio access device 50, and is received by the downlink mobile communication functionality 43B of the other radio network access device 32. In this manner, the uplink mobile communication functionality 62 of the mobile radio access device of the mobile radio access device 50 remains available for the processing of further request messages, for example.

Next, handover of the radio communication 70 by the mobile radio access device 50 is performed in collaboration with the mobile management entity functionality 40 available to the radio network access devices 31, 32 in accordance with protocols and procedures already known and used for a particular radio access technology used.

In a further example, also illustrated in FIG. 3, prior to transmission of the request for handover 107, the radio network access device 31 serving the communication 70 to be handed over, transmits by its downlink access node functionality 42A to uplink mobile communication functionality 62 of the mobile radio access device 50, a request 105 for providing signal quality data of signals from radio network access devices 31-37 received by the mobile radio access device 50.

In response to receiving this request 105 by the uplink mobile communication functionality 62 of the mobile radio access device 50, respective signal quality measurements are performed by the mobile radio access device 50, controlled by the processor circuitry 60 thereof. The collected and/or processed signal quality data is then transmitted 106, by the uplink mobile communication functionality 62 of the mobile radio access device 50, to the downlink access node functionality 42A of the radio network access device 31 serving the radio communication 70.

From the thus received signal quality data, for example, the radio network access device 31 may transmit, in accordance with a further example of the present disclosure, the request for handover 107 as a conditional handover request referring to a particular target radio network access device 32 for continuing the communication 70.

Accordingly, this targeted handover request is transmitted by the uplink mobile communication functionality 62 of the mobile radio access device 50 connected to downlink access node functionality 42 of the target radio network access device 32, or the received request for handover 107 is transferred 108 over the backbone functionality 64 of the mobile radio access device 50, to the uplink access node functionality 63 of the mobile radio access device 50, and subsequently transmitted 109 and received by the downlink mobile communication functionality 43B of the target radio network access device 32.

In another example of the present disclosure, also illustrated in FIG. 3, the uplink mobile communication functionality 62 of the mobile radio access device 50 receives a triggering signal 100 for transmitting the request 105 for providing signal quality data. This triggering signal 100 may be received by the mobile radio communication device 50 from a mobile robot or a manned vehicle, for example, not shown in FIG. 3, at which the mobile radio access device 50 is mounted, when this vehicle moves across the radio access network 30.

In the case of a mobile robot 301-304 operating in a loop or daisy chain 300, for example, when commanded to occupy a different geographic location 311-313, such command may be simultaneously used as triggering signal 100 for having the radio network access device 31 that serves an ongoing communication 70, to transmit a request for providing signal quality data to the mobile radio communication device 50, for initiating handover of the radio communication 70. See FIG. 8.

In response to the triggering signal 100, the uplink mobile communication functionality 62 of the mobile radio access device 50 connected to downlink access node functionality 42A of the radio network access device 31 serving the radio communication 70, transmits a triggering request 101 to the radio network access device 31 for transmitting the request 105 for providing signal quality data.

Figure 4:
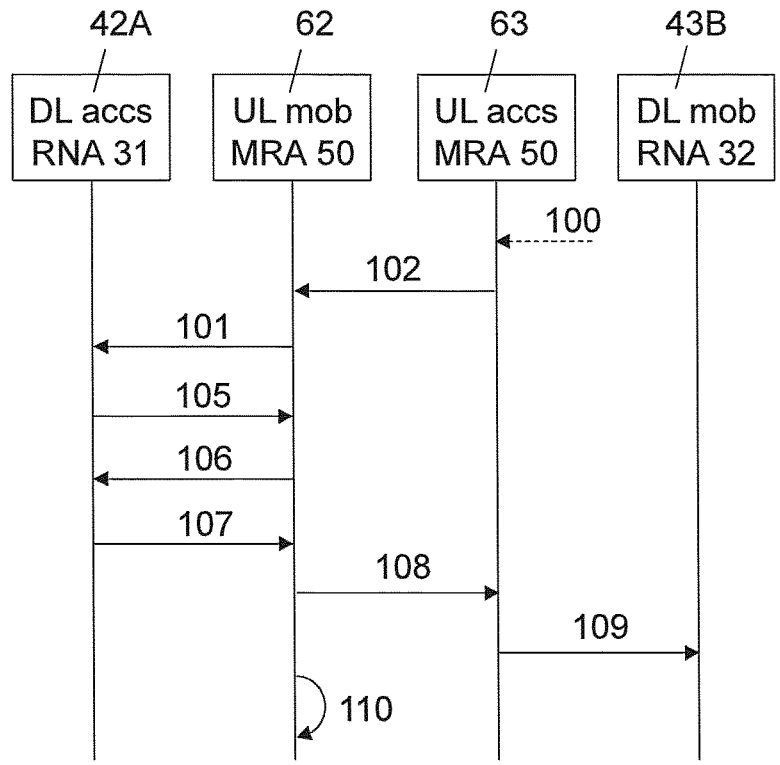

FIG. 4 shows an example of the method according to the present disclosure wherein the request for handover 107 received by uplink mobile communication functionality 62 of the mobile radio access device 50 is transferred 108 over the backbone link functionality 64 of the mobile radio access device 50 to uplink access node functionality 63 thereof, and transmitted 109 by the uplink access node functionality 63 for receipt by downlink mobile communication functionally 43B of a further radio network access device 32-37 of the plurality of radio network access devices.

FIG. 4 also illustrates, independent from the handling of the request for handover, receipt of the triggering signal 100 at the uplink access node functionality 63 of the mobile radio access device 50. In that case, the triggering signal 100 is transferred 102 over the backbone functionality 64 of the mobile radio access device 50 to the uplink mobile communication functionality 62 of the mobile radio access device 50 that connects to downlink access node functionality 42A of the radio network access device 31 serving the radio communication 70. The uplink mobile communication functionality 62, in response to the receipt of the transferred 102 triggering signal, transmits a triggering request 101 to the radio network access device 31 for transmitting the request 105 for providing signal quality data, as described above with reference to FIG. 3.

Figure 5:
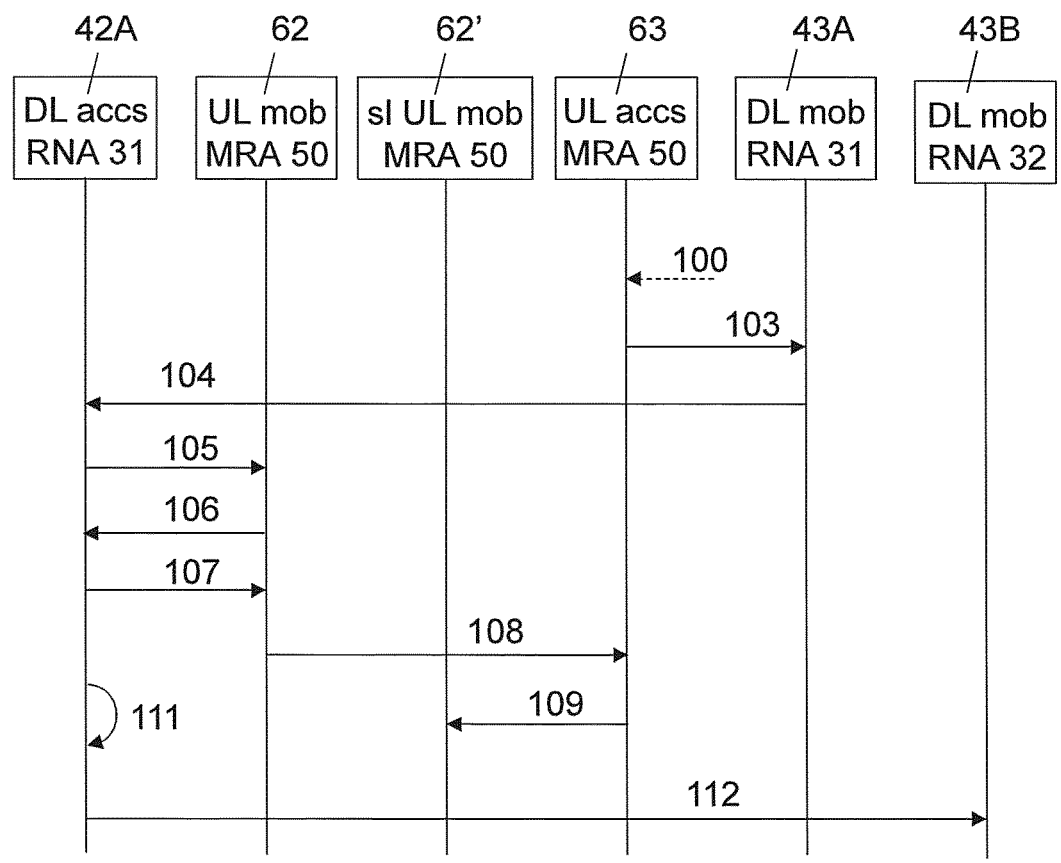

FIG. 5 illustrates, independent from the handling of the request for handover, receipt of the triggering signal 100 at the uplink access node functionality 63 of the mobile radio access device 50. In this case, the triggering signal 100 is transmitted 103 by the access node functionality 63 to downlink mobile communication functionality 43A of the radio network access device 31, DL mob RNA 31, serving the radio communication 70. At this radio network access device 31, the downlink mobile communication functionality 43A transfers 104 the triggering signal 100 over the backbone functionality 44 thereof to the downlink access node functionality 42A. In response to the receipt of the transferred 104 triggering signal, the downlink access node functionality 42A transmits the request 105 for providing signal quality data, as described above with reference to FIG. 3.

FIG. 5 also illustrates that, in another example of the present disclosure, the request for handover received by the uplink access node functionality 63 of the mobile radio access device 50 from a first or master uplink mobile communication functionality 62 thereof, may be transferred over the backbone functionality 64 to a second or slave uplink mobile communication functionality 62' of the mobile radio access device 50, sl UL mob MRA 50, for transmission of the request for handover for receipt by a further radio network access device 32-37 of the plurality of radio network access devices.

In accordance with the method of the present disclosure, a supported radio communication 70 may be detached or released, by the mobile radio access device 50, after a set time interval after having performed the handover 109 of the radio communication 70, as illustrated, by way of example, in FIG. 4 by a curved arrow 110. During the set time interval, the connection with the radio network access device 31 serving the radio communication 70 prior to the handover may be re-established, if necessary, provided that the mobile radio communication device 50 is still within the service area of the radio network access device 31.

In a further example of the method according to the present disclosure, the handover is further based on load calculations of any of the access node functionality 41 interfacing the user equipment 71, 72, 73 and the radio network access device 31 serving the radio communication 70, and the downlink access node functionality 42A and downlink mobile communication functionality 43A of the radio network access device 31 serving the radio communication 70 for exchanging messages for handover of the radio communication. For example, for performing a targeted handover 112, based on load calculations, to a radio access node of the RAN 30 having sufficient communication and/or signalling capacity for handling the radio communication 70 and/or the exchange of messages with mobile radio access devices 50, as schematically illustrated by the curved arrow 111 in FIG. 5.

Figure 6:
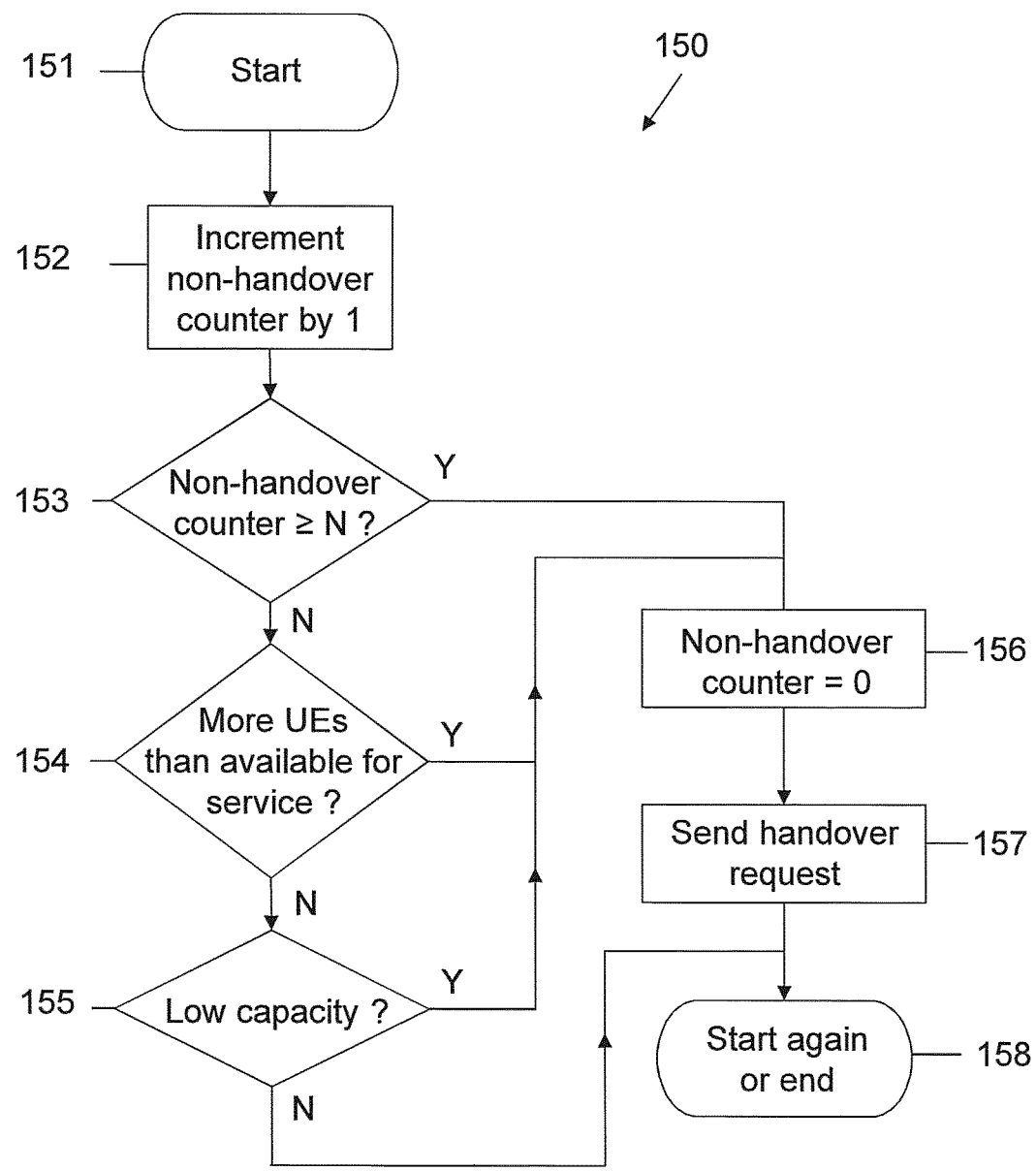
FIG. 6 shows a flow chart diagram illustrating handover by a radio network access device based on data throughput calculations.

FIG. 6 shows a flow chart diagram 150 illustrating capacity calculations by a radio network access device in a scenario wherein the radio network access devices are part of a geographically dispersed cluster wherein different physical radio network access devices may serve as a single radio network access device. In the flow chart diagram 150, the direction of the flow is assumed from the top to the bottom of the figure. Otherwise, the direction is indicated by a respective arrow. In such a scenario, each mobile radio access device may forwards measurements of the data capacity or data throughput handled by that particular mobile radio access to the radio access device serving radio communication of the mobile radio access device. Also the amount of requested data throughput may be forwarded to the radio network access device at a point in time prior to when this data throughput is required, for example 15 seconds before the data capacity is needed by the mobile radio access device. If this required throughput is more than, for example, 90% of the available bandwidth of the radio communication, such as 90% of the respective Uu interface, a flag is set indicating that more bandwidth is required.

As illustrated in block 151, "Start check for available downlink communication functionality", the radio network access device serving the radio communication starts a process for handing over the radio communication to a radio network access device that can provide the requested capacity. In block 152, "Increment non-handover counter by 1" a counter is incremented each time before considering handover by the serving radio network access node.

If this counter reaches a set value N, i.e. decision block 153 "Non-handover counter ≥N?", decision affirmative or yes, "Y", a handover request is initiated by the radio network access device, as illustrated by block 157, "Send handover request". The non-handover counter is set to zero again in block 156, "Non-handover counter=0". The process may end here or may start again, as illustrated in block 158, "Start again or end".

If the decision in decision block 153 is negative or no, "N", it is checked, by the radio network access device, whether there are more UEs are attached to the radio network access device than downlink communication functionality available, i.e. "More UEs than available for service?", decision block 154. In the affirmative, i.e. decision Y, handover is to be initiated following blocks 156, 157 and 158. If the decision of decision block 154 is negative N, it is checked whether the available data throughput or data capacity of the radio communication link between the radio network access device and the mobile radio access device is sufficient, i.e. decision block 155, "Low capacity?". If yes, decision Y of decision block 155, again a handover is to be initiated, i.e. blocks 156, 157, 158. If there is sufficient capacity, i.e. decision N of decision block 155, no handover is to be effected and the process may end or start again, i.e. block 158.

Figure 7:
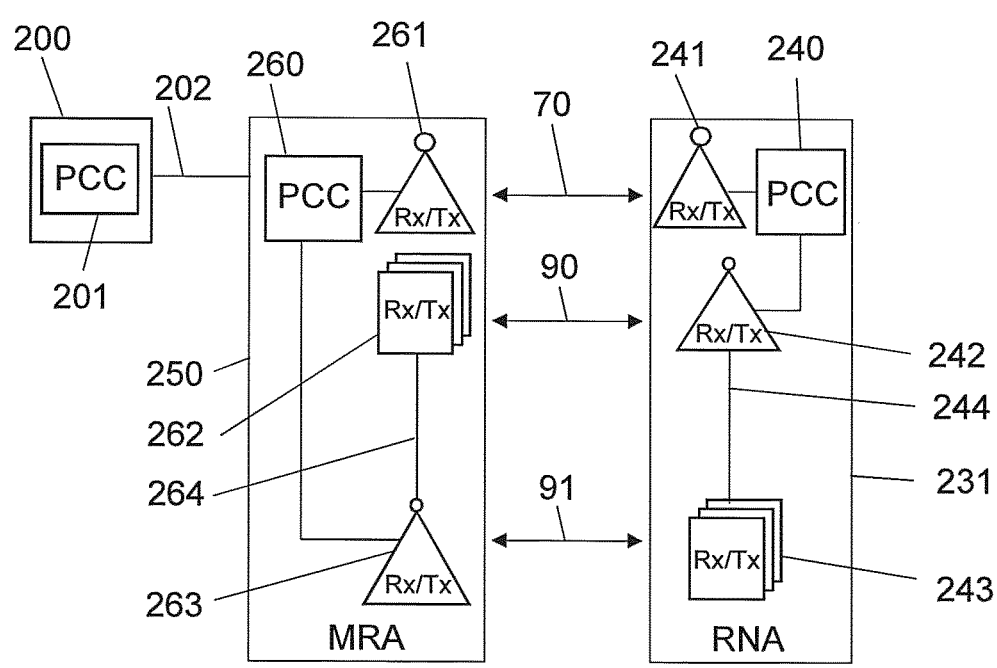
FIG. 7 shows a circuit diagram of a mobile device or mobile robot, a mobile radio access device and a radio network access device, in accordance with the present disclosure.

FIG. 7 shows a circuit diagram of a mobile device or mobile robot 200, a mobile radio access, MRA, device 250 and a radio network access, RNA, device 231, in accordance with the present disclosure.

The mobile radio access device 250 comprises first wireless transceiver circuitry, Rx/Tx, 261, operatively connected to processor control circuitry, PCC, 260, and arranged for providing access node functionality for interfacing a radio communication 70 between user equipment 71, 72, 73 and radio network access devices 31-37 operating in a radio access network 30. The mobile radio access device 250 comprises second wireless transceiver circuitry, Rx/Tx, 262, 263, operatively connected to the processor control circuitry 260, and arranged for providing interoperable 64, 264 uplink access node functionality 63 and uplink mobile communication functionality 62. Reference numeral 264 denotes a backbone link between the second wireless transceiver circuitry 262, 263. See also FIG. 2.

The second wireless transceiver circuitry 263 providing the uplink access node functionality 63 of the mobile radio access device 250 is arranged for connecting to downlink mobile communication functionality 43 of a plurality of radio network access devices 31-37 of the radio access network 30, and the second wireless transceiver circuitry 262 providing the uplink mobile communication functionality 62 of the mobile radio access device 250 is arranged for connecting to downlink access node functionality 42 of a plurality of radio network access devices 31-37 of the radio access network 30, for exchanging messages for handover of the radio communication 70.

The transceiver circuitry 261, 262, 263 may be arranged for providing radio communication of any of radio access technologies as described above with reference to FIG. 1. The processor control circuitry 260 is arranged for handover of a radio communication 70 in accordance with the method of the present disclosure, as elucidated above.

The radio network access device 231 comprises first wireless transceiver circuitry 241, Rx/Tx, operatively connected to processor control circuitry, PCC, 240, and arranged for providing access node functionality for interfacing a radio communication between user equipment operating in a radio access network 30, and a radio communication core network.

The radio network access device 231 further comprises second wireless transceiver circuitry, Rx/Tx, 242, 243, operatively connected to the processor control circuitry 240, and arranged for providing interoperable 44, 244 downlink access node functionality 42 and downlink mobile communication functionality 43. Reference numeral 244 denotes a backbone link between the second wireless transceiver circuitry 242, 243. See also FIG. 2.

The second wireless transceiver circuitry 242 providing the downlink access node functionality 42 of the radio network access device 231 is arranged for connecting to uplink mobile communication functionality 62, UL mob, of a plurality of mobile radio access devices operating in the radio access network 30, and the second wireless transceiver circuitry 243 providing the downlink mobile communication functionality 43 of the radio network access device 231 is arranged for connecting to uplink access node functionality 63 of a plurality of mobile radio access devices 250 operating in the radio access network 30, for exchanging messages for handover of a radio communication 70.

The transceiver circuitry 241, 242, 243 may be arranged for providing radio communication of any of radio access technologies as described above with reference to FIG. 1. The processor control circuitry 240 is arranged for handover of a radio communication 70 in accordance with the method of the present disclosure, as elucidated above, and may provide mobile management entity functionality 40 available to the radio network access device 231, in accordance with protocols and procedures already known and used for a particular radio access technology.

Reference numeral 200 schematically denotes a moving vehicle or mobile robot, comprising processor control circuitry, PCC, 201 and at least one mobile radio access device 250 as disclosed above. The processor control circuitry 201 of the mobile robot operatively connects 202 to one or both of the second wireless transceiver circuitry 262, 263 of the mobile radio access device 250 uplink mobile communication functionality 62 or uplink access node functionality 263, either directly or indirectly via the processor control circuitry 260, and is arranged, among others, for providing a triggering signal for triggering a handover of the radio communication 70 in accordance with the method disclosed above.

Figure 8:
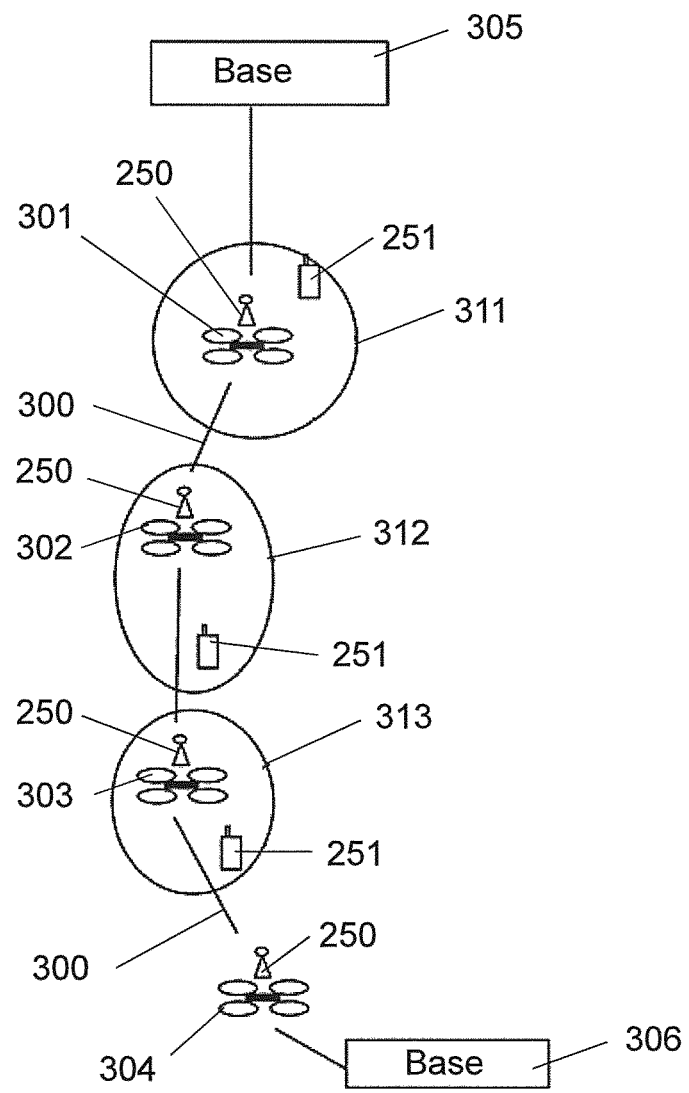
FIG. 8 illustrates, schematically, a chain of mobile robots, for providing coverage of a wireless communication, and arranged for handing over radio communication in accordance with the present disclosure.

FIG. 8 illustrates an embodiment of a plurality of mobile robots 301, 302, 303, 304 deployed in a so-called daisy chain loop 300, having its start and end point at a maintenance base 305, 306. Each mobile robot in the loop or chain 300 takes a substantially stationary geographic position and comprises a mobile radio access device 250 for providing wireless access to end user equipment 251 in a respective geographic radio coverage area 311-313 of a thus deployed mobile robot 301-303.

In the example shown in FIG. 8, mobile robot 304 is not providing service. Maintenance base 305 may be a departing or launching base and maintenance base 306 may be a landing base of the mobile robots. The radio coverage areas 311-313 provide, as a whole, a required coverage for a wireless communication network.

Each mobile robot 301-304 in the loop or chain 300 needs to be periodically replaced. A new or fresh robot may take the vacant position of a replaced robot or, alternatively, the mobile robots in the loop or chain 300 may each be consecutively re-arranged to take up a vacant position closer to the end of the loop or chain 300, and the new mobile robot takes up a thus created vacant position at the start of the loop or chain 300.

When a mobile robot 301-304 moves from a present geographic position to a new geographic position, and thereby covers a new geographic radio coverage area, while user equipment 251 in a particular geographic radio coverage area 311, 312, 313 of the mobile robot 301, 302, 303 do not concurrently move to the new geographic radio coverage area, i.e. camp in the present geographic radio coverage area, the radio communication links or attachments of the user equipment 251 have to be handover to a new mobile robot taking up the present geographic position.

Figure 9:
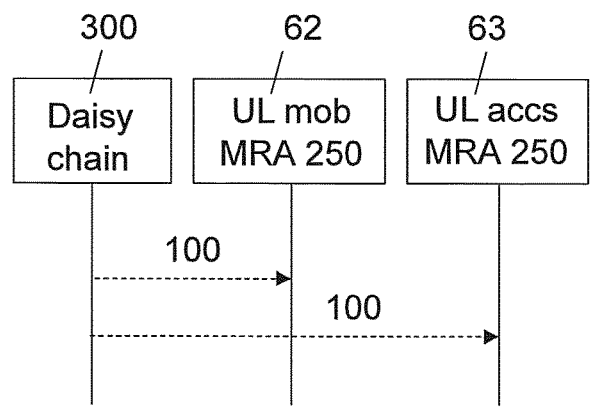

The sequence chart in FIG. 9 shows the transmission of a triggering signal 100 by a mobile robot 301-303, or other mobile vehicle or mobile device, to its on-board mobile radio access, MRA, device 250, as explained above with reference to FIGS. 3-5. The triggering signal may be transmitted, in an example of the present disclosure, when the mobile robot starts to change its geographical position.

Assume there is a sequence of 1-N mobile robots in a chain taking up 1-N different geographic positions, such that one mobile robot occupies one geographic position, and each geographic position having number n+1 is closer to the landing base 306 than a geographic position having number n, wherein n and N are integer values and 1≤n≤N.

A triggering signal 100 for requesting handover may be transmitted if a mobile robot 301-304 begins to change or switch its geographical position from n to n+1.

Other variations to the disclosed examples can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method of handover of radio communication between user equipment and radio network access devices of a radio access network, operatively connected by an intermediate mobile radio access device comprising access node functionality interfacing the radio communication between the user equipment and the radio network access devices; the mobile radio access device comprising interoperable uplink access node functionality and uplink mobile communication functionality; the radio network access devices comprising access node functionality interfacing the radio communication between the user equipment and the radio network access devices, and comprising interoperable downlink access node functionality and downlink mobile communication functionality; wherein uplink access node functionality of the mobile radio access device connects to downlink mobile communication functionality of a plurality of radio network access devices; wherein uplink mobile communication functionality of the mobile radio access device connects to downlink access node functionality of a plurality of radio network access devices, for exchanging messages for handover of the radio communication; the method comprising:

receiving, by the uplink mobile communication functionality of the mobile radio access device and from the downlink access node functionality of a radio network access device serving the radio communication, a request for handover of the radio communication;

prior to receiving the request for handover by the mobile radio access device:

receiving, by the uplink mobile communication functionality of the mobile radio access device and from the downlink access node functionality of the radio network access device serving the radio communication, a request for providing signal quality data of signals from radio network access devices received by the mobile radio access device; and transmitting, in response to the request and by the uplink mobile communication functionality of the mobile radio access device connected to downlink access node functionality of the radio network access device serving the radio communication, the requested signal quality data;

transmitting, by the uplink mobile communication functionality of the mobile radio access device, the request for handover for receipt by a further radio network access device of the plurality of radio network access devices; and performing handover of the radio communication by the mobile radio access device in association with a mobile management entity functionality available to the radio network access device serving the radio communication and a further radio network access device of the radio access network having received the handover request transmitted by the uplink mobile communication functionality of the mobile radio access device.

2. The method of claim 1, further comprising, prior to receiving the request for providing signal quality data by the mobile radio access device:

receiving, by the uplink mobile communication functionality of the mobile radio access device connected to downlink access node functionality of the radio network access device serving the radio communication or the uplink access node functionality of the mobile radio access device connected to downlink mobile communication functionality of the radio network access device serving the radio communication, a triggering signal for transmitting the request for providing signal quality data; and/or transmitting, by the uplink mobile communication functionality of the mobile radio access device connected to downlink access node functionality of the radio network access device serving the radio communication or the uplink access node functionality of the mobile radio access device connected to downlink mobile communication functionality of the radio network access device serving the radio communication, a triggering request for transmitting the request for providing signal quality data.

3. The method of claim 1:

wherein the received handover request is a conditional handover request referring to a target radio network access device;

wherein the handover request is transmitted by uplink mobile communication functionality of the mobile radio access device for receipt by the target radio network access device.

4. The method of claim 1:

wherein the uplink access node functionality and the uplink mobile communication functionality of the mobile radio access device connect by backbone link functionality at the mobile radio access device;

wherein the request for handover received by uplink mobile communication functionality of the mobile radio access device is transferred over the backbone link functionality to uplink access node functionality of the mobile radio access device and transmitted by the uplink access node functionality for receipt by downlink mobile communication functionally of a further radio network access device of the plurality of radio network access devices.

5. The method of claim 1, wherein a supported radio communication is detached by the mobile radio access device after a set time interval after performing handover of the radio communication.

6. A method of handover of a radio communication between user equipment and radio network access devices of a radio access network, operatively connected through an intermediate mobile radio access device comprising access node functionality interfacing the radio communication between the user equipment and the radio network access devices; wherein the mobile radio access device comprises interoperable uplink access node functionality and uplink mobile communication functionality; wherein the radio network access devices comprise access node functionality interfacing the radio communication between the user equipment and the radio network access devices, and interoperable downlink access node functionality, and downlink mobile communication functionality; wherein uplink access node functionality of the mobile radio access device connects to downlink mobile communication functionality of a plurality of radio network access devices; wherein uplink mobile communication functionality of the mobile radio access device connects to downlink access node functionality of a plurality of radio network access devices, for exchanging messages for handover of the radio communication; the method comprising:

transmitting, by the downlink access node functionality of a radio network access device serving the radio communication and to the uplink mobile communication functionality of the mobile radio access device, a request for handover of the radio communication;

prior to the transmitting the request for handover of the radio communication:

transmitting, by the downlink access node functionality of the radio network access device serving the radio communication and to the uplink mobile communication functionality of the mobile radio access device, a request for providing signal quality data of signals from radio network access devices received by the mobile radio access device; and receiving, by the downlink access node functionality of the radio network access device serving the radio communication and from uplink mobile communication functionality of the mobile radio access device, the requested signal quality data; and performing handover of the radio communication by the radio network access device serving the radio communication in association with the mobile radio access device and a mobile management entity functionality available to the radio network access device serving the radio communication and a further radio network access device to which the radio communication is to be handover.

7. The method of claim 6, further comprising, prior to the transmitting the request for providing signal quality data:

receiving, by the downlink access node functionality of the radio network access device serving the radio communication and from the uplink mobile communication functionality of the mobile radio access device, a triggering request for transmitting the request for providing signal quality data;

wherein the downlink access node functionality and the downlink mobile communication functionality of the radio network access device connect by backbone link functionality at the radio network access device; and wherein the triggering request is forwarded by the downlink mobile communication functionality over the backbone link functionality to the downlink access node functionality of the radio network access device.

8. The method of claim 6, wherein the request for handover transmitted by the radio network access device serving the radio communication is a conditional handover request referring to a target radio network access device for handover of the radio communication, based on signal quality data received at the radio network access device serving the radio communication.

9. The method of claim 8:

wherein the conditional handover is further based on load calculations of the access node functionality interfacing the user equipment and/or the radio network access device serving the radio communication; and wherein the downlink access node functionality and the downlink mobile communication functionality of the radio network access device serving the radio communication exchange messages for handover of the radio communication.

10. A mobile radio access device, comprising first wireless transceiver circuitry operatively connected to processing circuitry and configured to provide access node functionality for interfacing a radio communication between user equipment and radio network access devices operating in a radio access network;

second wireless transceiver circuitry operatively connected to the processing circuitry and configured to provide interoperable uplink access node functionality and uplink mobile communication functionality, wherein the uplink access node functionality of the mobile radio access device is configured for connecting to downlink mobile communication functionality of a plurality of radio network access devices of the radio access network, and wherein the uplink mobile communication functionality of the mobile radio access device is configured for connecting to downlink access node functionality of a plurality of radio network access devices of the radio access network, for exchanging messages for handover of radio communications;

wherein the processing circuitry is configured to cause, related to a handover of a radio communication:

receiving, by the uplink mobile communication functionality of the mobile radio access device and from the downlink access node functionality of a radio network access device serving the radio communication, a request for handover of the radio communication;

prior to receiving the request for handover by the mobile radio access device:

receiving, by the uplink mobile communication functionality of the mobile radio access device and from the downlink access node functionality of the radio network access device serving the radio communication, a request for providing signal quality data of signals from radio network access devices received by the mobile radio access device; and transmitting, in response to the request and by the uplink mobile communication functionality of the mobile radio access device connected to downlink access node functionality of the radio network access device serving the radio communication, the requested signal quality data;

transmitting, by the uplink mobile communication functionality of the mobile radio access device, the request for handover for receipt by a further radio network access device of the plurality of radio network access devices; and performing handover of the radio communication by the mobile radio access device in association with a mobile management entity functionality available to the radio network access device serving the radio communication and a further radio network access device of the radio access network having received the handover request transmitted by the uplink mobile communication functionality of the mobile radio access device.

11. A radio network access device, configured to operate in a radio access network, comprising:

first wireless transceiver circuitry operatively connected to processing circuitry and configured to provide access node functionality for interfacing a radio communication between user equipment and a radio communication network;

second wireless transceiver circuitry operatively connected to the processing circuitry and configure to provide interoperable downlink access node functionality and downlink mobile communication functionality, wherein the downlink access node functionality of the radio network access device is configured for connecting to uplink mobile communication functionality of a plurality of mobile radio access devices operating in the radio access network, and wherein the downlink mobile communication functionality of the radio network access device is configured for connecting to uplink access node functionality of a plurality of mobile radio access devices operating in the radio access network, for exchanging messages for handover of radio communications;

wherein the processing circuitry is configured to cause, related to a handover of a radio communication:

transmitting, by the downlink access node functionality of a radio network access device serving the radio communication and to the uplink mobile communication functionality of the mobile radio access device, a request for handover of the radio communication;

prior to transmitting the request for handover by the radio network access device:

transmitting, by the downlink access node functionality of the radio network access device and to the uplink mobile communication functionality of the mobile radio access device serving the radio communication, a request for providing signal quality data of signals to mobile radio access device by the radio network access devices; and receiving, in response to the request and by the uplink mobile communication functionality of the mobile radio access device connected to downlink access node functionality of the radio network access device serving the radio communication, the requested signal quality data; and performing handover of the radio communication by the radio network access device serving the radio communication in association with the mobile radio access device and a mobile management entity functionality available to the radio network access device serving the radio communication and a further radio network access device to which the radio communication is to be handover.

* * * * *